United States Patent
Schmitt et al.

(10) Patent No.: US 6,261,023 B1
(45) Date of Patent: Jul. 17, 2001

(54) ARTICULATED ELEMENT FOR A SUPPORT

(75) Inventors: Bernd Schmitt, Huenfeld-Michelsrombach; Rainer Weigl, Fulda-Aschenberg, both of (DE)

(73) Assignee: Wella Aktiengesellschaft, Darmstadt (DE)

( * ) Notice: Subject to any disclaimer, the term of this patent is extended or adjusted under 35 U.S.C. 154(b) by 0 days.

(21) Appl. No.: 09/341,246
(22) PCT Filed: Nov. 19, 1998
(86) PCT No.: PCT/EP98/07420
  § 371 Date: Jul. 15, 1999
  § 102(e) Date: Jul. 15, 1999
(87) PCT Pub. No.: WO99/26016
  PCT Pub. Date: May 27, 1999

(30) Foreign Application Priority Data

Nov. 19, 1997 (DE) .............................. 197 51 313
May 19, 1998 (DE) .............................. 298 09 454

(51) Int. Cl.$^7$ .................................................. F16C 11/04
(52) U.S. Cl. ............................ 403/91; 403/58; 248/291.1
(58) Field of Search ................................ 403/84, 87, 91, 403/96, 116, 119, 164, 165, 57, 58; 285/184, 185; 248/291.1, 299.1, 814; 362/287, 418, 427

(56) References Cited

U.S. PATENT DOCUMENTS

| | | | |
|---|---|---|---|
| 5,154,382 | * 10/1992 | Hoshino | 248/291.1 X |
| 5,265,833 | * 11/1993 | Heimann et al. | 248/291.1 X |
| 5,290,074 | * 3/1994 | Chapman | 285/184 |
| 5,732,920 | * 3/1998 | Reynoso et al. | 403/164 X |
| 5,820,287 | * 10/1998 | Bartlett et al. | 403/84 |
| 5,836,561 | * 11/1998 | Liao | 403/87 X |

* cited by examiner

Primary Examiner—Harry C. Kim
(74) Attorney, Agent, or Firm—Michael J. Striker

(57) ABSTRACT

Articulated part (1) for a stand (2) with an axially rotatable and vertically swivelable articulated arm (3), wherein the articulated part (1) has a pivot pin (6) which can be connected with a carrier (5) by a connection part (4), and wherein the articulated part (1) has a tilting joint (7) for the articulated arm (3), wherein it is provided according to the invention that the articulated part (1) is essentially formed of a one-part plastic injection-molded part (1.1), wherein the tilting joint (7) has two bearing disks (8) formed of sheet metal which have an opening (9) roughly in the center, wherein the bearing disks (8, 8) are embedded parallel to one another at a distance (A) in the plastic injection-molded part (1.1), wherein the openings (9) form a joint bearing (10) for the tilting joint (7).

9 Claims, 6 Drawing Sheets

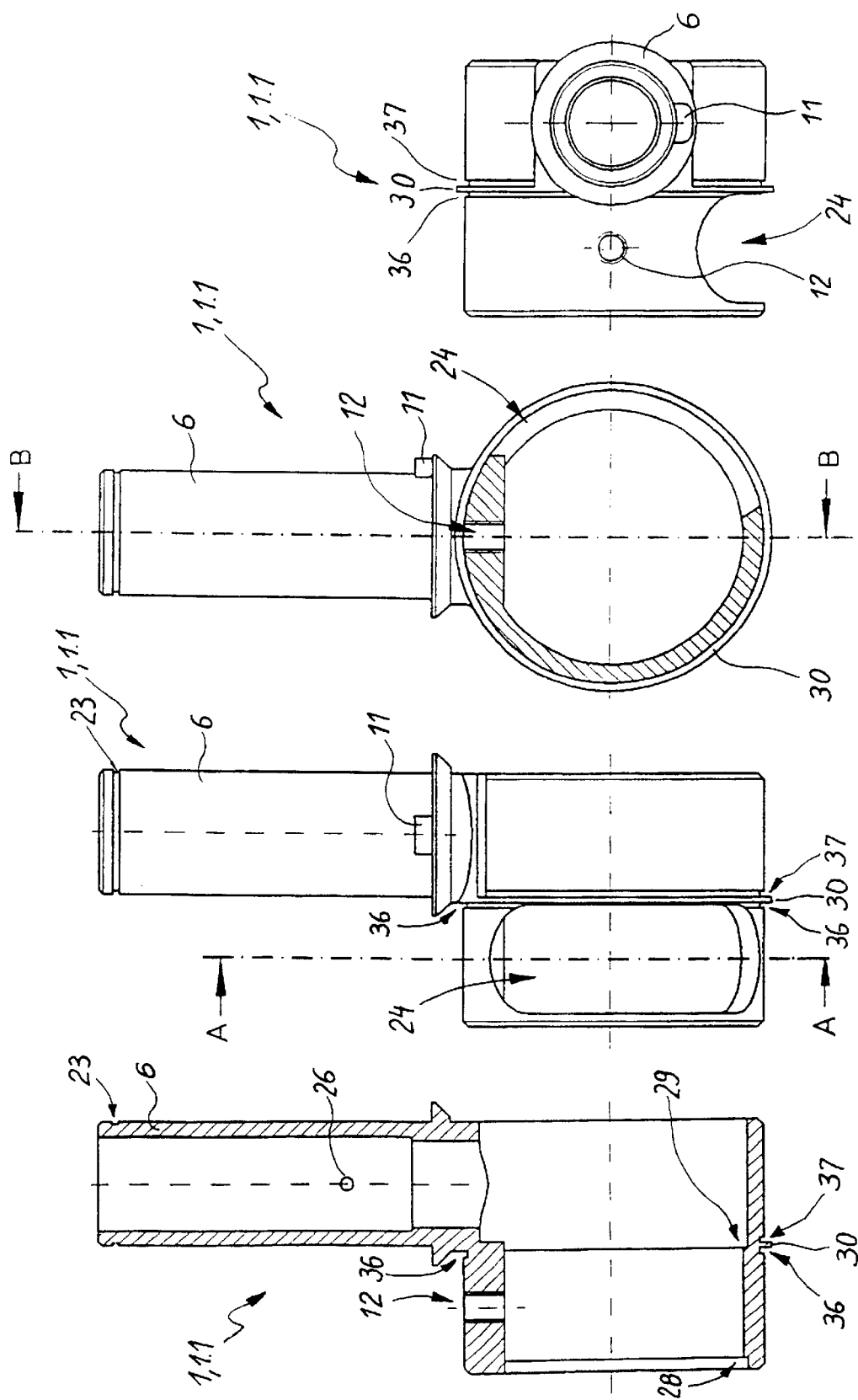

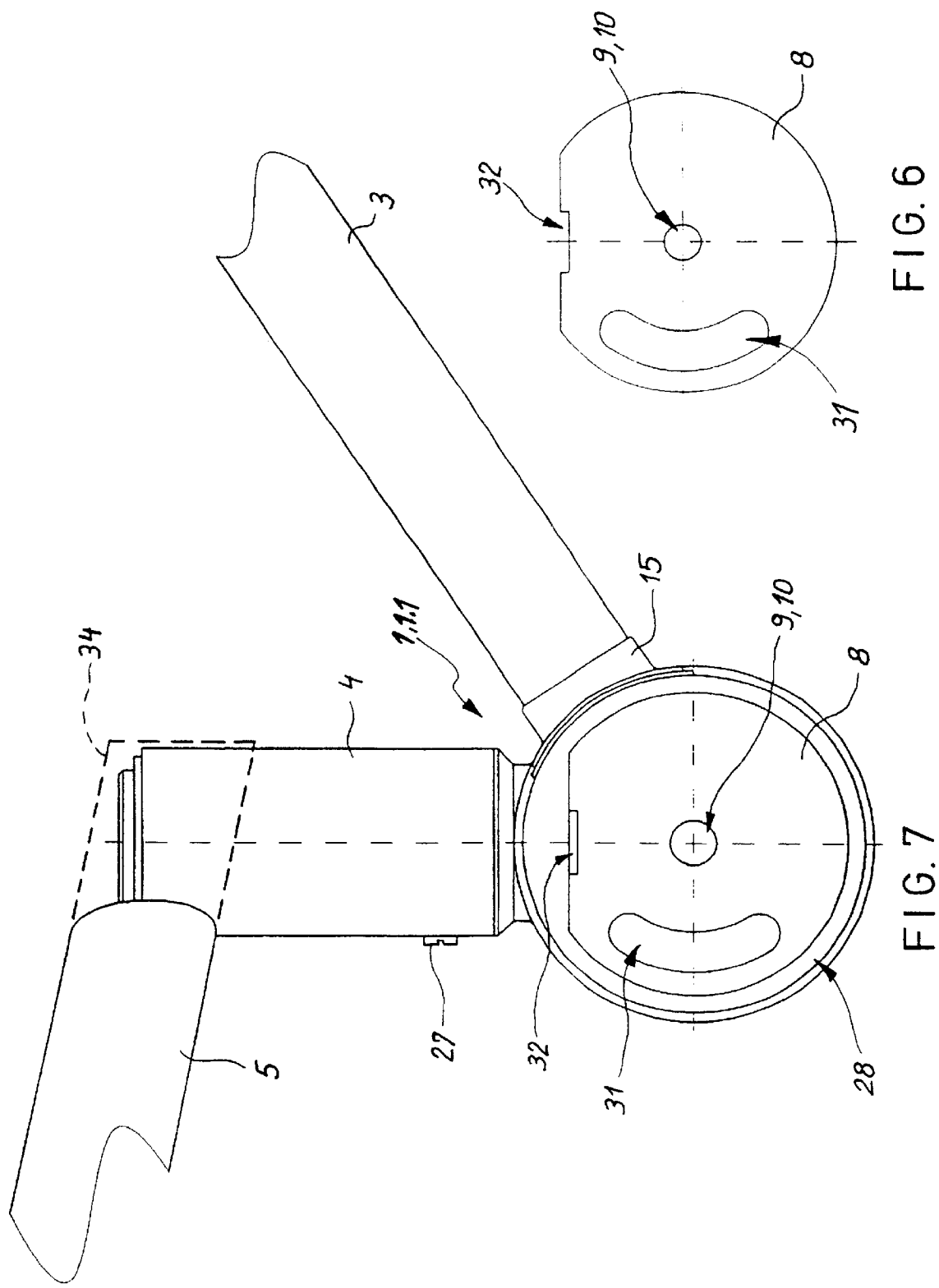

ARTICULATED ELEMENT FOR A SUPPORT

BACKGROUND OF THE INVENTION

The invention is directed to an articulated part for a support or stand. Articulated parts for a support or stand are known, which include an axially rotatably and vertically swivelable articulated arm, and a pivot pin connectable with a carrier by a connection part. Such articulated parts can be further improved.

SUMMARY OF THE INVENTION

It is the object of the invention to provide an articulated part of the type mentioned above which is extremely economical to produce.

In keeping with these objects, one feature of present invention, resides, briefly stated in an articulated part which is formed as a one-pire plastic part, with the tilting joint having two bearing disks formed of metal sheet with an opening roughly in the center, and the bearing disks are arranged parallel to one another at a distance in the plastic part with the openings forming a joint bearing for the tilting point.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2 to 5 show different views of an articulated part, wherein a section A—A according to FIG. 3 is shown in FIG. 2 and a section B—B according to FIG. 2 is shown in FIG. 4;

FIG. 6 shows a top view of an individual bearing disk;

FIG. 7 shows a partial view of the articulated part with embedded bearing disks;

DESCRIPTION OF PREFERRED EMBODIMENTS

Figure 1:
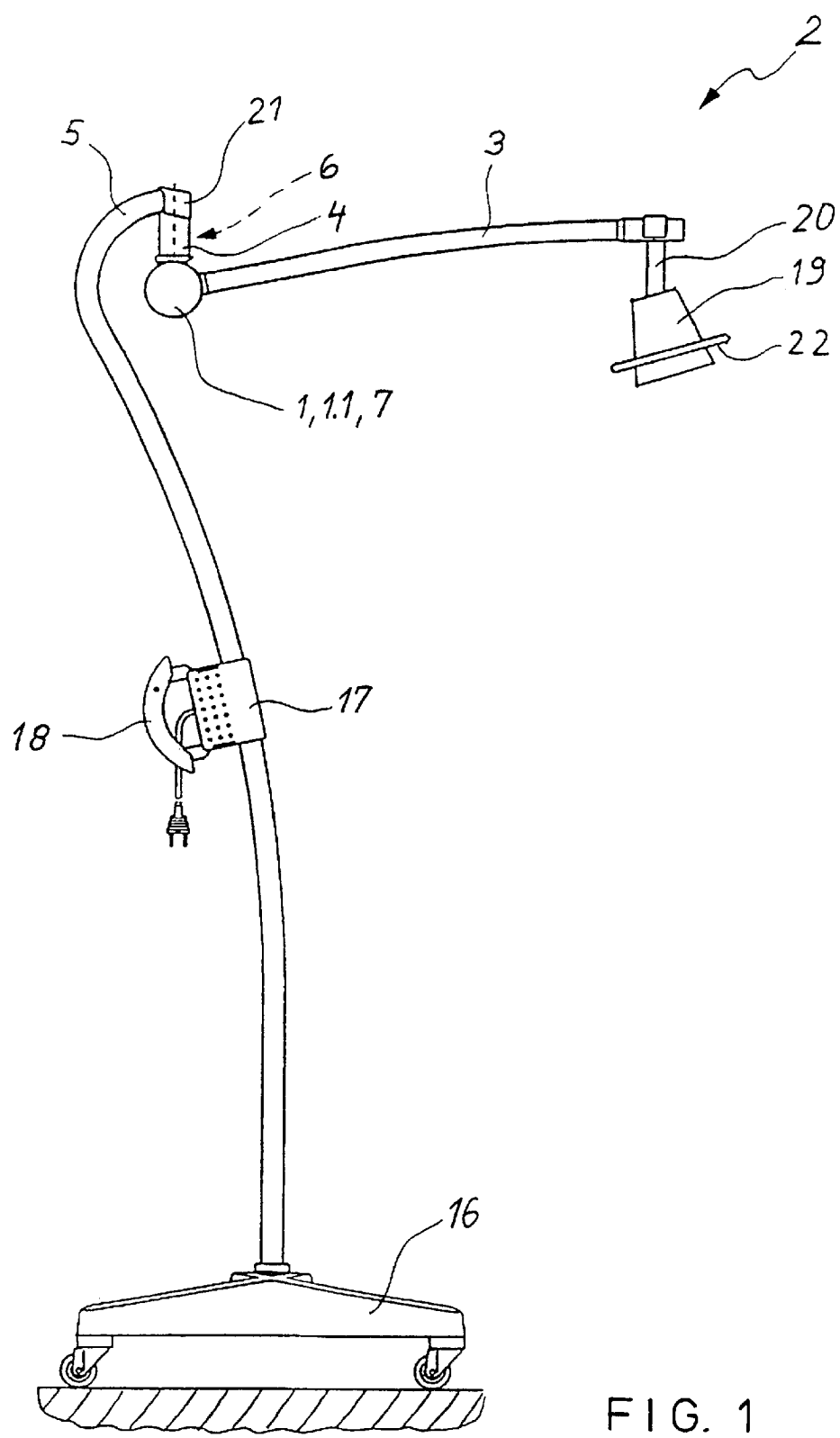
FIG. 1 is a side view of a complete stand.

FIG. 1 shows an articulated part 1 for a stand 2 with an axially rotatable and vertically swivelable articulated arm 3. The articulated part 1 has a pivot pin 6 which can be connected with a carrier 5 by means of a connection part 4. The articulated part 1 is provided with a tilting joint 7 for the articulated arm 3. The stand 2 is provided with a movable base 16, a low-voltage transformer 17 with a handle 18, and an adjustable lamp head 19. The transformer 17 supplies a lamp (for example, a 12V/50W halogen lamp), not shown, via a cable which is arranged inside the carrier 5, connection part 4, articulated part 1, articulated arm 3 and a lamp head connection 20. The upper end of the connection part 4 and the end of the carrier 5 are closed by a plastic cap 21. The lamp head 19 is advisably provided with an adjusting grip 22.

The articulated part 1 shown in FIG. 2 is essentially formed of a one-part plastic injection-molded part 1.1 which is provided with an injection-molded threaded insert 12 for a spring force adjusting device 13 (FIGS. 8 to 11). The articulated part 1 is provided with a pivot pin 6 having a rotation stop 11 at the start and an annular groove 23 at the end.

An articulated-arm opening 24 is clearly shown in FIG. 3 which is rotated by 90 degrees with respect to FIG. 2.

Figure 8:
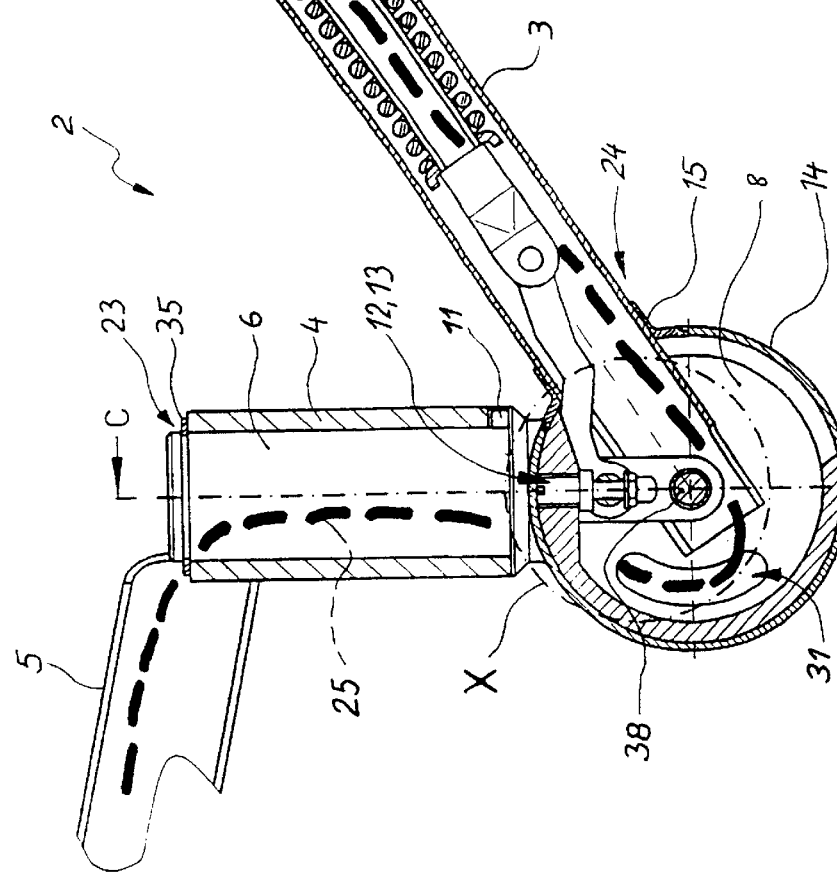
FIG. 8 shows the view from FIG. 7 in section.

FIG. 4 shows that the articulated part 1, 1.1 is substantially hollow, especially the pivot pin 6 which simultaneously forms a channel for a cable 25 indicated in FIG. 8. An injection-molded threaded insert 12 is provided for a spring force adjusting device 13 (FIG. 8, etc.). The articulated arm 3 can be fastened axially to the connection part 4 by means of a bore hole 26 and a corresponding screw 27 (FIG. 7). Two bearing disk receptacles 28, 29 are provided for receiving two bearing disks 8 (FIG. 6).

Figure 10:
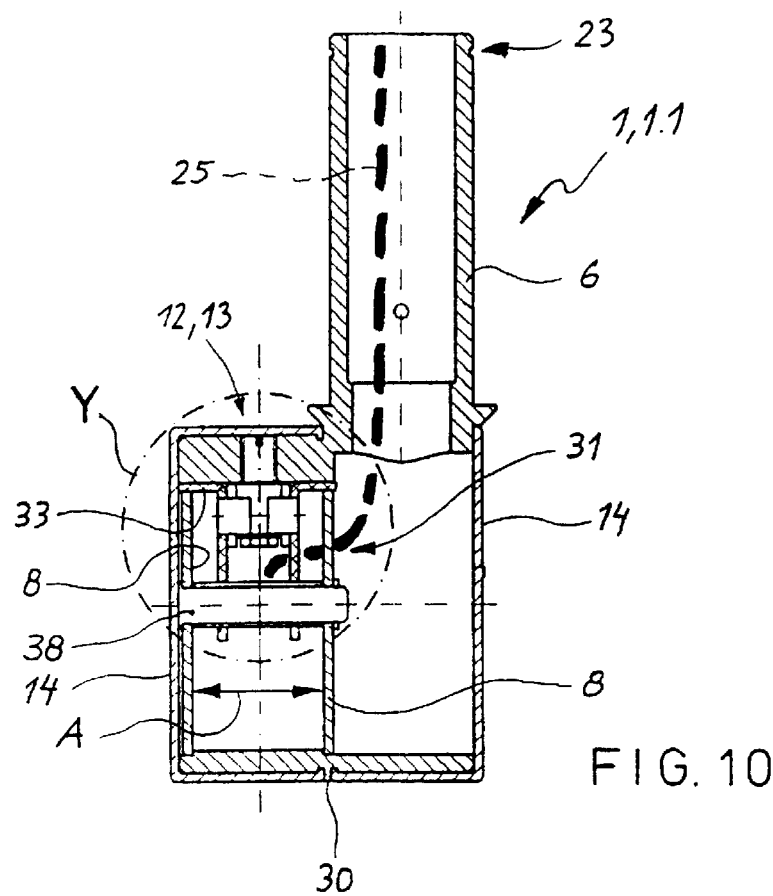
FIG. 10 is a sectional view of section C—C from FIG. 8 without a connection part.

A top view of the articulated part 1, 1.1 according to FIG. 3 is shown in FIG. 5. In particular, the articulated-arm opening 24 is clearly shown. Also shown is a stop rib 30 which serves as an adjustment stop for the cladding parts 14 (FIG. 10). Locking grooves 36, 37 for snapping in the cladding parts 14 are arranged on both sides of the stop rib 30.

Figure 11:
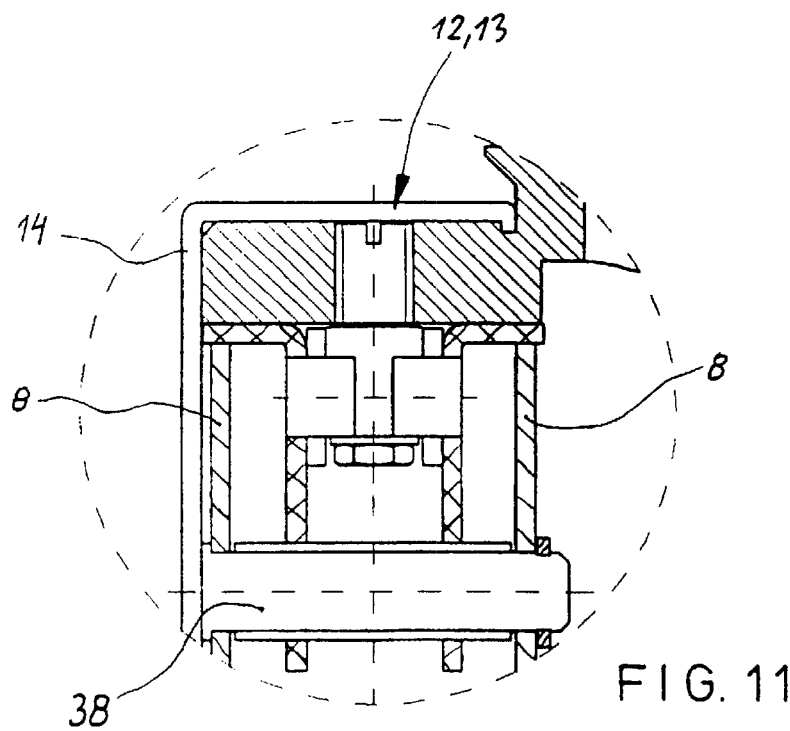
FIG. 11 is an enlarged view of detail Y from FIG. 10.

An individual bearing disk 8 is shown in FIG. 6. The bearing disk 8 is provided with an opening 9 for a joint bearing 10. A coaxial elongated hole 31 is provided for passing a supply cable 25 through the articulated part 1, 1.1. The bearing disks 8 can be produced economically by punching, especially when the disks 8 are identical. A recess 32 serves to receive a guide angle 33 (FIGS. 10 and 11).

FIG. 7 shows a partial view of the stand 2 in which the articulated part 1, 1.1 is connected with the connection part 4 and the articulated arm 3. FIG. 7 also shows the bearing disk 8 embedded in the bearing disk receptacle 28 and a cover 34 indicated in dashed lines. Further, an articulated-arm cladding 35 (shown in FIGS. 15, 16, 17) is provided which covers the articulated-arm opening 24 in every tilting position.

Figure 9:
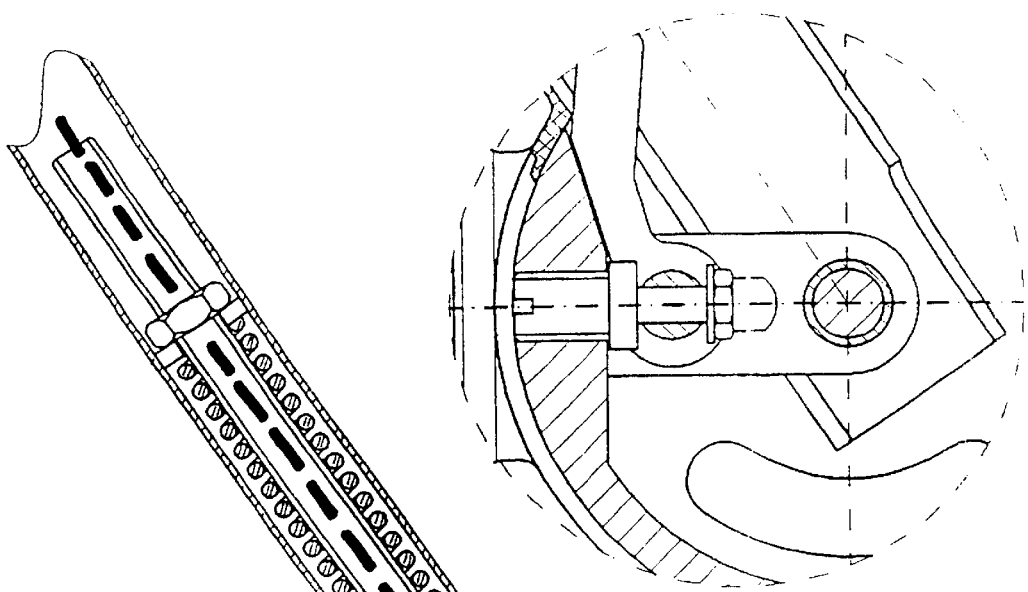
FIG. 9 shows an enlarged view of detail X in FIG. 8.

FIG. 8 shows a sectional view with all of the individual parts. The spring force adjusting device 13 and the guiding of the cable 25, indicated in bold dashes, are shown in particular. The pivot pin 6, including the articulated arm 3, is supported by a holding ring 35 arranged in the groove 23. An enlarged section X is shown in FIG. 9.

FIG. 10 shows, in particular, the position of the two bearing disks 8, 8 which are embedded in parallel in the articulated part 1, 1.1 at a distance A, wherein the openings 9, 9 form a joint bearing 10 for the tilting joint 7 by means of a hinge pin 30 which is secured in position. The fastening (snapping in) of the two cladding parts 14, 14 at the articulated part 1, 1.1 is also shown, wherein the cladding part 14 is locked in below the pivot pin 6, the cladding part 14 of the joint bearing 10 rotates with the movements of the articulated arm 3.

An enlarged view of detail Y in shown in FIG. 11.

Figure 12:
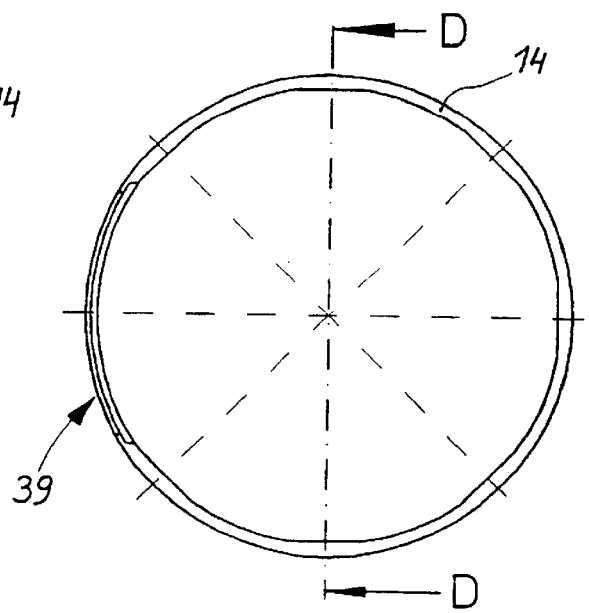
FIG. 12 is a top view of a cladding part.

FIG. 12 shows a top view of the cladding part 14. The cladding part 14 is constructed in the manner of a shell and has a recess 39 serving as a passage for the connection part 4 and for the articulated arm 3, since both cladding parts 14, 14 (FIG. 10) are identical. Projections 40 are provided for locking into the grooves 36, 37 (FIG. 5, etc.).

Figure 13:
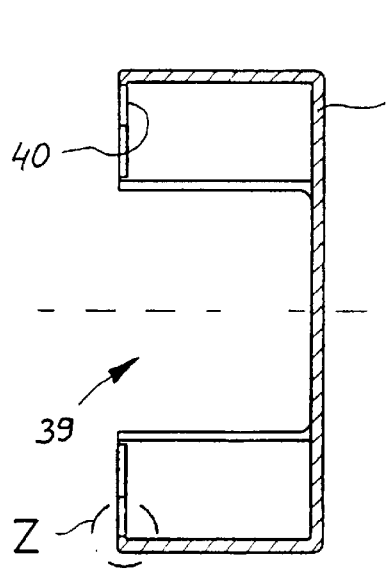
FIG. 13 is a sectional view according to section D—D of FIG. 12.
Figure 14:
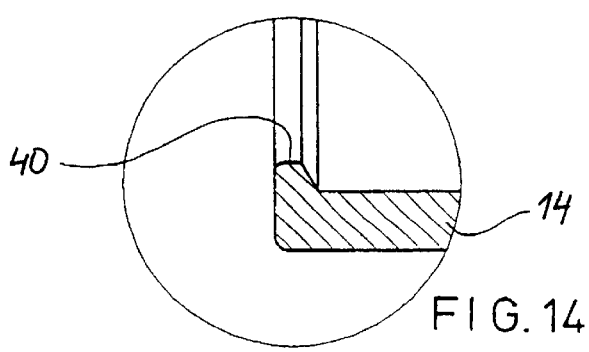
FIG. 14 shows an enlargement of detail Z according to FIG. 13.

FIG. 13 shows section D—D according to FIG. 12. An enlarged detail Z is shown in FIG. 14.

Figures 15, 16, 17:
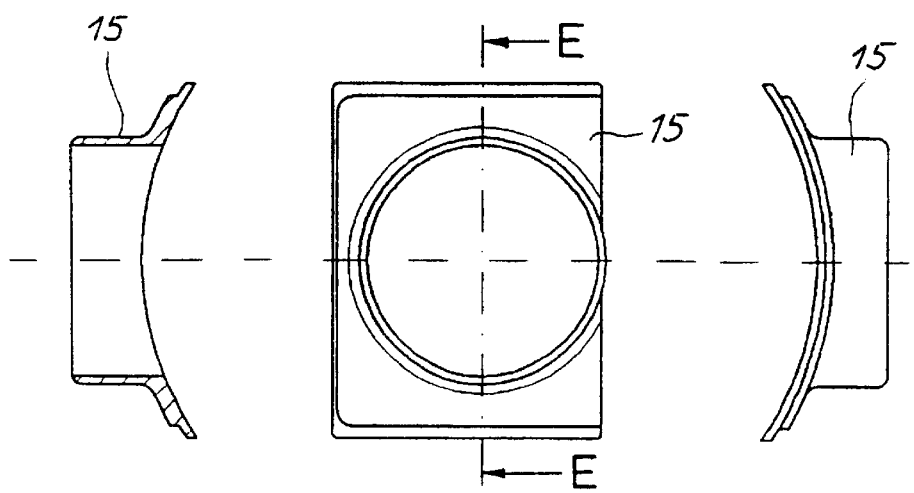
FIG. 15 is a sectional view of section E—E according to FIG. 16.
FIG. 16 is a top view of a closure part of an articulated arm.
FIG. 17 is a side view according to FIG. 16.

The articulated-arm closing part 15 is shown more clearly in FIGS. 15, 16 and 17.

In summary, the following advantages result from the invention:

- the articulated part is an economical injection-molded plastic part;
- no additional expenditure on bearings is required because of the pairing of work materials, namely, plastic (pivot pin 6) and steel (connection part 4 and bearing);
- the two relatively large bearing disks 8, 8 additionally stiffen the plastic injection-molded part 1.1 and distribute forces occurring over a large area;
- economical manufacture of the punched, identical bearing disks;
- the two cladding parts 14 are made from plastic and are identical (cost advantage);
- owing to optional coloring of the plastic parts, no subsequent painting is required;
- no after-machining of individual parts is required;
- optional, simple power or force adjustment from the outside.

What is claimed is:

1. An articulated part for a stand having an axially rotatable and vertically swivelable articulated arm and a carrier, said articulated part having a body with a pivot pin connectable with the carrier; a connection part for connecting said pivot pin with said carrier; a tilting joint for connection with the articulated arm, said body with said pivot pin being formed as a one-piece plastic injection-molded part, said tilting joint having two bearing disks formed of sheet metal and having an opening substantially in a center, said bearing disks being imbedded parallel to one another at a distance in said plastic injection-molded part, and said openings of said bearing disks forming a joint bearing for said tilting joint.

2. An articulated part as defined in claim 1, wherein at least one of said bearing disks has a coaxial elongated hole.

3. An articulated part as defined in claim 1, wherein said bearing disks are formed as punched parts.

4. An articulated part as defined in claim 1, wherein said bearing disks are identical.

5. An articulated part as defined in claim 1, wherein said bearing disks are embedded in said plastic injection-molded part so as to be fixed with respect to rotation relative to the latter.

6. An articulated part as defined in claim 1, wherein said pivot pin is provided with a rotation stop.

7. An articulated part as defined in claim 1, wherein said plastic injection-molded part is provided with an injection-molded threaded insert for a spring force adjusting device.

8. An articulated part as defined in claim 1, wherein each of said bearing disks is covered with an identical cladding part.

9. An articulated part as defined in claim 1, wherein said plastic injection-molded part is provided with an articulated-arm closing part.

* * * * *